United States Patent [19]

Drummond

[11] Patent Number: 4,504,071
[45] Date of Patent: Mar. 12, 1985

[54] TWO WHEELED UTILITY CART

[76] Inventor: Richard S. Drummond, 1504 SW. 1st St., Rochester, Minn. 55901

[21] Appl. No.: 423,791

[22] Filed: Sep. 27, 1982

[51] Int. Cl.³ ............................................... B62B 5/02
[52] U.S. Cl. .................................. 280/5.24; 280/47.27; 280/47.37 R
[58] Field of Search ............... 280/47.27, 47.28, 47.24, 280/47.37 R, 655, 5.22, 5.24, 5.32; 188/23

[56] References Cited

U.S. PATENT DOCUMENTS

| | | | |
|---|---|---|---|
| 836,921 | 11/1906 | Chase et al. | 280/47.28 |
| 2,519,113 | 8/1950 | Cohn | 280/5.24 |
| 2,800,337 | 7/1957 | Avril | 188/23 |
| 3,647,236 | 3/1972 | Hayes | 280/47.27 |
| 3,684,307 | 8/1972 | Bourgraf et al. | 280/654 |
| 4,130,291 | 12/1978 | Saethre et al. | 280/5.22 |
| 4,275,894 | 6/1981 | Mortenson | 280/654 |

*Primary Examiner*—David M. Mitchell
*Attorney, Agent, or Firm*—George A. Gust

[57] ABSTRACT

A wheeled hand truck of the type having an elongated frame with a load engaging platform and a set of wheels near one end and user handles near the other end includes a stairstep engaging leg which is pivotally mounted on the frame intermediate the ends and selectively movable between a stowed position and an extended position where the leg will selectively engage a step and prevent sliding movement of the truck down a flight of steps. An auxiliary handle is also provided to aid movement of loads along staircases with that auxiliary handle being selectively movable between a retracted position where the truck may be used in a conventional manner and an operative position extending obliquely from the frame from the end opposite the platform to provide a user with a more readily accessible gripping region when moving the truck along a flight of steps. A spring clip is provided for maintaining the leg in its retracted position during periods of non-use and the auxiliary handle is spring loaded toward its retracted position so that the hand truck may be used in a conventional manner yet readily converted for moving loads along staircases.

11 Claims, 3 Drawing Figures

TWO WHEELED UTILITY CART

BACKGROUND OF THE INVENTION

1. Field of the Invention

The present invention relates to utility carts of the two-wheeled, hand-operated variety frequently employed for moving refrigerators, ranges, washers and similar appliances as well as large cumbersome containers and the like, and more particularly to improvements in such carts facilitating their use in moving loads along staircases.

2. Description of the Prior Art

The use of two-wheeled utility carts also frequently referred to as hand or warehouse trucks is rather common. The trucks typically include an elongated frame with handles near an upper end thereof and a pair of wheels near the bottom thereof and with a pair of generally orthogonal load bearing surfaces including a lower lip or platform which may be slid under a heavy object to be moved whereupon the object and truck are pivoted about the wheels so as to balance the load on the wheels allowing a single individual to move an otherwise unmanageable load. So long as the truck remains on a relatively level surface, heavy loads can easily be moved, however, when the load is to be moved up or down a staircase, a load which was rather easily maneuvered by a single person frequently requires two or three people to prevent the load from getting out of control.

The prior art is replete with attachments and modifications for such trucks attempting to adapt them to stairway use bearing eloquent testimony to the problems associated with the movement of heavy loads up or down a staircase, but unfortunately leaving the problem substantially unsolved. These attachments and the modifications have frequently taken the form of staircase engaging skids, rollers or roller supported tracks, however, in these cases the truck user must at all times exert sufficient force to prevent the truck and load from sliding down the staircase in an uncontrolled manner. Also, in the use of such trucks on staircases, at least one of the two or more persons moving the heavy load must be positioned on a higher step than the step or steps on which the load and truck rest and must, therefore, bend over, reaching perhaps lower than his own feet to grasp the truck, exerting an upward force thereon. In such a position, the user is precariously exposed to back injuries and the like and is further exerting forces on the truck and load at an unfavorable angle.

SUMMARY OF THE INVENTION

Among the several objects of the present invention may be noted hand truck operation with reduced likelihood of user injury or damage to goods being moved; the provision of a wheeled hand truck which will allow a user to rest on intermediate steps while moving a load along a staircase; the provision of a wheeled hand truck which provides the user with a readily accessible gripping region when moving the truck along a flight of steps; the provision of a wheeled hand truck in accordance with the previous object allowing the user to pull the truck at a preferred pulling angle thereby reducing the incidence of back injuries and the like; and the general facilitation of movement of heavy loads along a staircase. These as well as other objects and advantageous features of the present invention will be in part apparent and in part pointed out hereinafter.

In general a wheeled hand truck includes an arrangement for aiding movement of loads up and down staircases including a selectively extendable leg for engaging a step and precluding the sliding movement of the truck down the staircase when the leg is extended and a selectively extendable auxiliary handle which in the extended position provides a user with a readily accessible gripping region for pulling the load up a staircase as well as lowering a load down a staircase. The leg may be spring biased toward the extended position and a locking arrangement for stowing the leg away from its extended position during periods of non-use may be provided. A set of lubricous surfaced runners for supporting the truck and associated load on the staircase may also be included.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

Corresponding reference characters indicate corresponding parts throughout the several views of the drawing.

Figure 1:
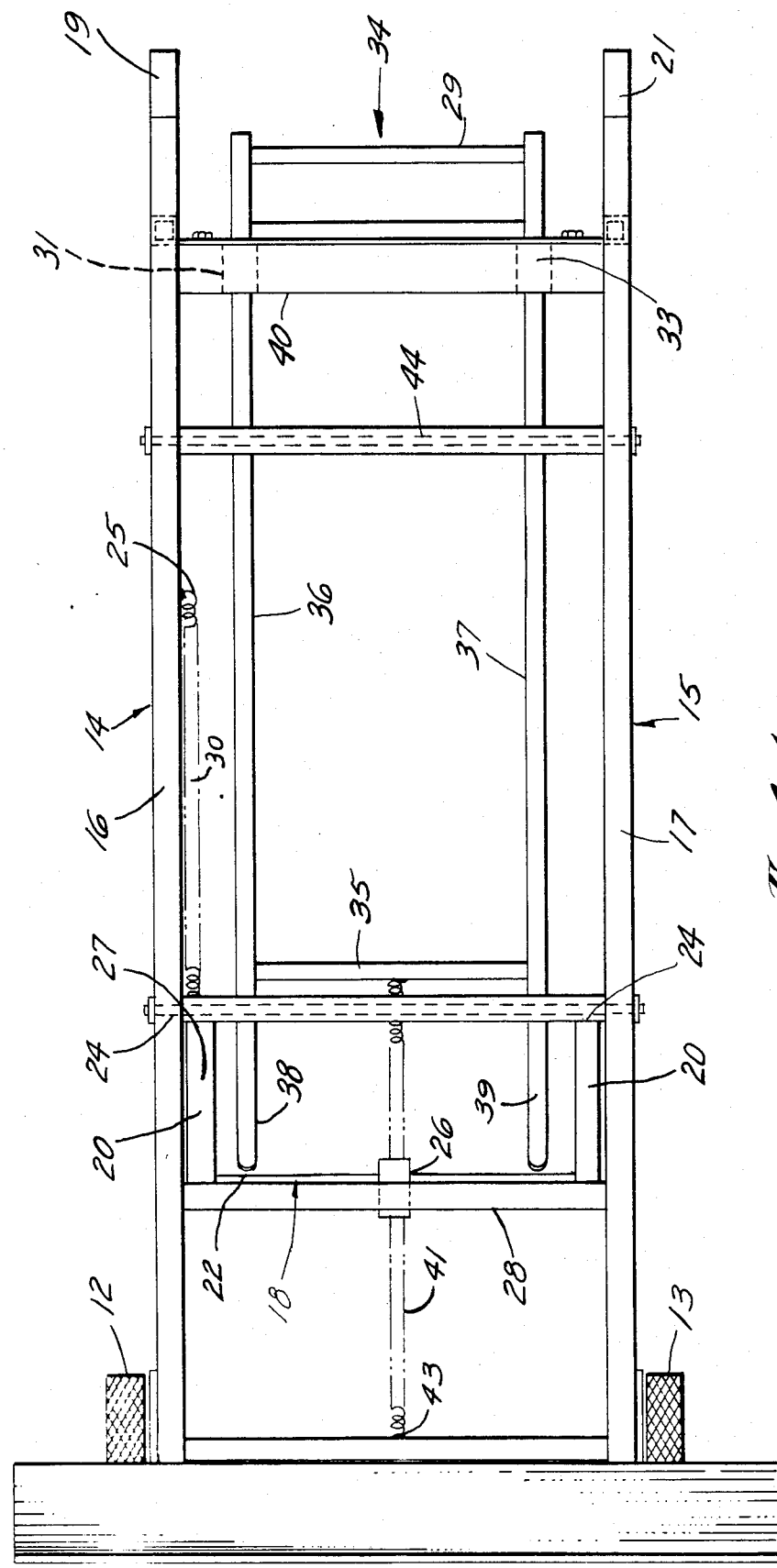
FIG. 1 is a front elevation view of a wheeled hand truck incorporating one form of the invention.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring to the drawing generally, there is illustrated a two-wheeled hand truck of the type having an elongated box-like frame 10 and wheels 12 and 13 near a lower end thereof with a load engaging lip or platform 11 near that lower end and user grippable handles near the upper end thereof. The frame 10 may include rear rails 14 and 15 having adhered thereto along a substantial extent thereof lubricous strips 16 and 17 of, for example, nylon to aid the sliding of a load up a staircase or the gliding thereof down a staircase. In normal operation on flat surfaces, the hand truck is positioned adjacent a load in the vertical and the load is tipped slightly so that platform 11 may be slid under that load and then both the load and truck pivoted about the wheels 12 and 13 so that the load is essentially balanced on those wheels with user gripping hand grip portions 19 and 21 to wheel the load to any desired location. When the load is to be moved along a staircase, the truck is pivoted about the wheels until the strips 16 and 17 engage the staircase as depicted in FIG. 3.

Figure 2:
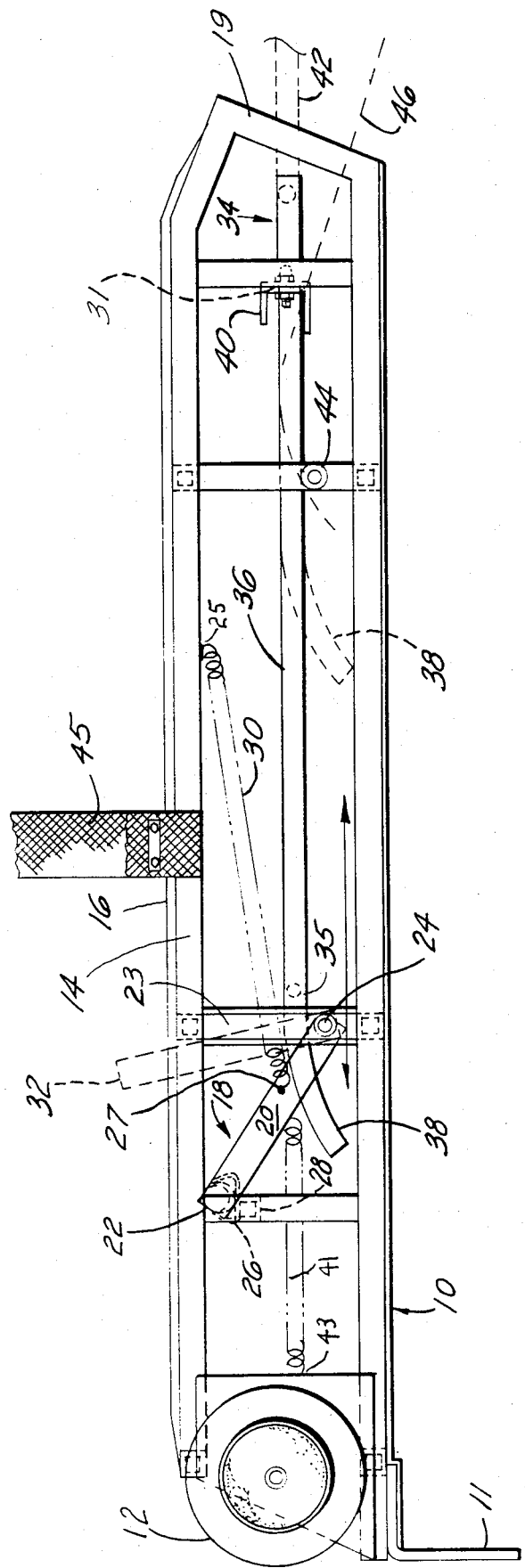
FIG. 2 is is a side elevation view of the hand truck of FIG. 1.
Figure 3:
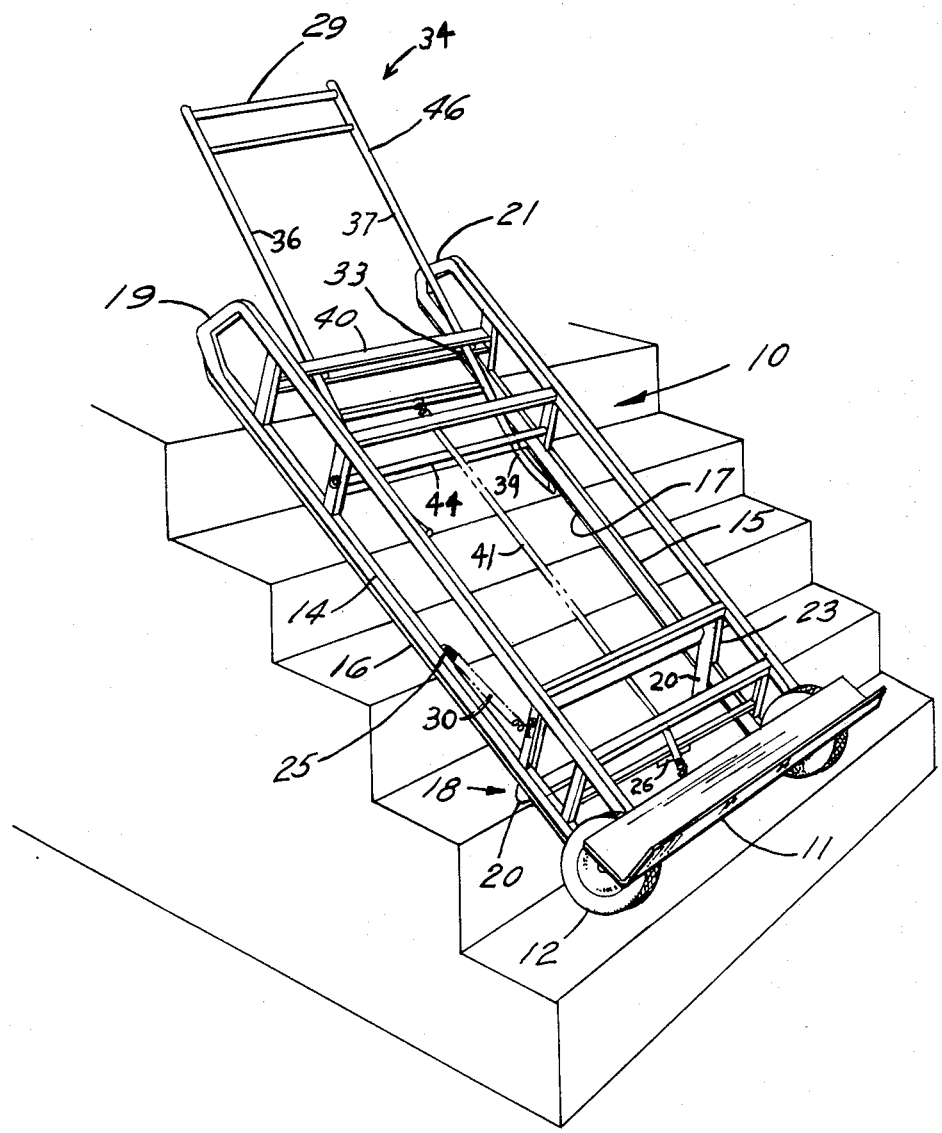
FIG. 3 illustrates the hand truck of FIGS. 1 and 2 engaging a staircase.

The truck is provided with a stairstep engaging leg or holder frame 18 pivotably mounted on a cross member 23 of the frame 10 at 24 with leg 18 being selectively movable between the stowed position illustrated in FIG. 2 and an extended position illustrated in FIG. 3, and by dotted lines in FIG. 2 at 32. In this extended position, the leg selectively engages a step to preclude sliding movement in the direction of frame elongation down a flight of steps as illustrated in FIG. 3. Leg 18 is biased toward the extended position by a tension spring 30 so that when a user is sliding the truck up a flight of steps in the elongated direction of the frame 10, the leg 18 pivots to engage each succeeding step. In other words, the truck and load may be urged up a staircase in a ratchet-like manner. During periods of non-use, such as when the load is being transported on a level surface or in lowering a load down a staircase, the leg 18 is stowed in its retracted position as illustrated in FIG. 2 by engaging that leg with a spring clip 26 which is secured to cross member 28 on the cart frame 10 with that spring clip resiliently gripping the bar 22 of leg 18.

More particularly, the leg or holder frame 18 comprises two spaced arms 20 and cross member 22 pivotably secured by means of an elongated pivot pin at the upper ends at 24 to the cart sides. A tension spring 30 for biasing leg 18 toward its extended position is secured at one end 25 to rail 14 of the frame 10 and at the other end at 27 to one of the pivoted arms 20 intermediate the ends thereof.

The user grippable handle portions 19 and 21, while advantageously positioned for moving a load along a horizontal surface, are awkwardly located for moving a load up or down a staircase, and the present invention provides an auxiliary handle 34 which is selectively movable between a retracted position illustrated in FIGS. 1 and 2 and an extended position illustrated in dotted lines at 46 in FIG. 2 and in FIG. 3. In the retracted position, the truck may be used in a conventional manner, while in position 46 extending obliquely from the frame 10, handle 34 provides the user with a more readily accessible gripping region when moving the truck along a flight of steps.

In greater detail, the handle 34 includes two elongated parallel bars 36 and 37 having curved portions 38 and 39 near the ends thereof with a cross bar 29 spanning the other ends thereof and serving as a handle for manipulating the cart. The two generally parallel bars 36 and 37 are mounted on the cart frame 10 by being slidably passed through companion slots 31 and 33 in cross member 40 of the cart frame 10. Handle 34 may be moved from its normal stowed or retracted position to its extended or operative position by merely drawing the handle upwardly to the dashed line position 42 of FIG. 2 until the curved ends 38 and 39 engage roller 44 on the cart frame, causing the handle 34 to tilt or rotate into the dashed line position 46. A stop bar 35 on handle 34 engages cross member 40 and limits extension of the handle and a coil spring 41 couples stop bar 35 to frame 10 at 43 so as to bias handle 34 toward its retracted or stowed position. When handle 34 is extended and the cart positioned on a staircase, the handle extends from the cart at about 20 degrees to 30 degrees from the vertical.

The details of the truck or cart not otherwise disclosed herein are conventional as is its use on horizontal surfaces; however, when a single user desires to move a load up a staircase he may unlock the leg 18 by withdrawing horizontal cross member 22 from the spring clip 26, allowing the bias spring 30 to move that leg into its extended position 32. An upward pull on the cross member 29 will extend the gripping portion 34 of the auxiliary handle so that the user may move ahead of the truck and load up the stairs, pulling on handle 34 and allowing leg 18 to swing inwardly as it engages the corner of each successive step and upon passing such corner, flipping back to position 32. If the user desires to rest, he merely relaxes the pull on handle 34 until leg 18, in the position 32, engages a step, holding the cart in position along the staircase. Leg 18 will normally be in its stowed position and the handle portion 34 in its extended position while descending a staircase, however, the leg 18 may be extended allowing a user to rest in the process of lowering a load down a staircase if desired. A load retaining strap 45 may be provided if desired.

From the foregoing it is now apparent that a novel hand truck usable in a conventional manner and facilitating the movement of loads along staircases has been disclosed meeting the objects and advantageous features set out hereinbefore as well as others, and that modifications as to the precise configurations, shapes and details may be made by those having ordinary skill in the art without departing from the spirit of the invention or the scope thereof as set out by the claims which follow.

What is claimed is:

1. In a wheeled hand truck of the type having an elongated frame with a load engaging lip and a set of wheels near one end thereof and user grippable handles near the other end thereof, the improvement comprising a stairstep engaging leg pivotably mounted on the frame intermediate the one and other ends selectively movable between a stowed position and an extended position for selectively engaging a step and precluding sliding movement in the direction of elongation down a flight of steps, an auxiliary handle selectively movable between a retracted position for conventional truck use and an operative position extending obliquely from the frame other end to provide a user with a more readily accessible gripping region when moving the truck along a flight of steps, the auxiliary handle being slidable relative to the frame and including a curved portion near one end thereof, the frame including slot means in which the auxiliary handle may slide and means cooperating with the handle curved portion and the auxiliary handle approaches the operative position to induce rotation of the auxiliary handle in conjunction with the sliding movement thereof, and spring means biasing the handle toward the retracted position.

2. The improvement of claim 1 further including spring means biasing the leg toward the extended position whereby a user may slide the truck up a flight of steps in the elongated direction thereof and the leg pivots to engage each succeeding step.

3. The improvement of claim 1 further comprising a spring clip for grasping and maintaining the leg in the retracted position during periods of non-use.

4. The improvement of claim 1 wherein when the frame is positioned to engage a series of steps extending therealong in the elongated direction thereof, the auxiliary handle extends upwardly therefrom at an angle of about 20 degrees to 30 degrees from vertical.

5. The improvement of claim 1 wherein the frame includes a set of lubricous surfaced runners extending in the direction of elongation along a side of the frame from which the leg extends when in its extended position.

6. In a wheeled hand truck of the type having an elongated frame with a load engaging lip and a set of wheels near one end thereof and user grippable handles near the other end thereof, the improvement comprising an auxiliary handle selectively movable between a retracted position for conventional truck use and an operative position extending obliquely from the frame other end to provide a user with a more readily accessible gripping region when moving the truck along a flight of steps, the auxiliary handle including a curved portion near one end thereof and the frame including slot means in which the auxiliary handle may slide and means cooperating with the handle curved portion as the auxiliary handle approaches the operative position to induce rotation of the auxiliary handle in conjunction with the sliding movement thereof, and spring means biasing the handle toward the retracted position.

7. The improvement of claim 6 wherein when the frame is positioned to engage a series of steps extending therealong in the elongated direction thereof, the auxiliary handle extends upwardly therefrom at an angle of about 20 degrees to 30 degrees from vertical.

8. The improvement of claim 6 including a stairstep engaging leg pivotably mounted on the frame intermediate the one and other ends selectively movable between a stowed position and an extended position for selectively engaging a step and precluding sliding movement in the direction of elongation down a flight of steps.

9. The improvement of claim 8 wherein the frame includes a set of lubricous surfaced runners extending in the direction of elongation along a side of the frame from which the leg extends when in its extended position.

10. In a wheeled hand truck of the type having an elongated frame with a load engaging lip and a set of wheels near one end thereof and user grippable handles near the other end thereof, the improvement for aiding movement of loads up and down staircases comprising a selectively pivotably extendable leg intermediate the ends of the frame for engaging a step and precluding sliding movement of the truck down the staircase when the leg is extended, the leg being spring biased toward the extended position, and a selectively slidably extendable auxiliary handle which in the extended position thereof provides a user with a readily accessible gripping region for pulling a load up a staircase as well as lowering a load down a staircase, means for locking the leg away from the extended position during periods of nonuse, and means spring biasing the handle toward its retracted position.

11. The improvement of claim 10 further comprising a set of lubricous surfaced runners for supporting the truck and any associated load on the staircase.

* * * * *